Jan. 2, 1968 P. F. FORMAN ET AL 3,360,849
METAL TO GLASS WELDING
Filed March 1, 1962
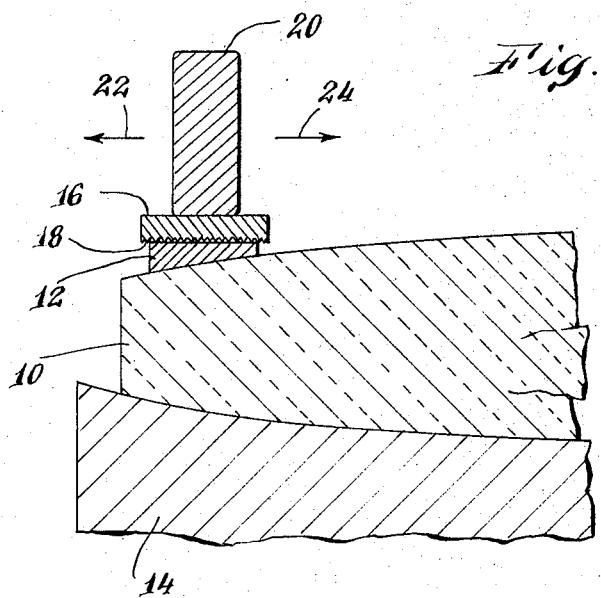
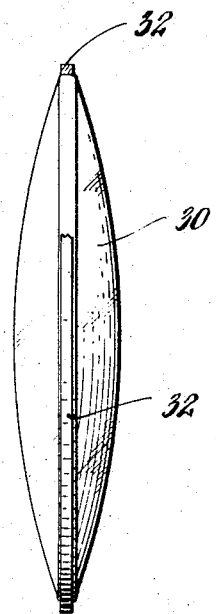
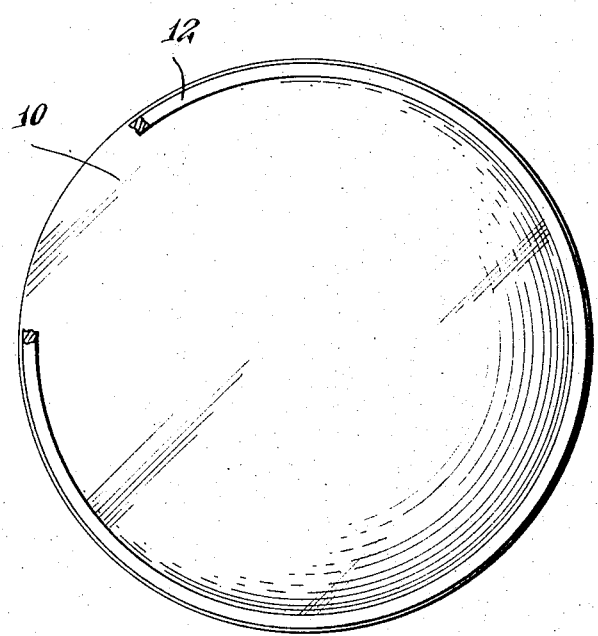
INVENTORS.
Paul F. Forman
Roy Stoll

3,360,849
METAL TO GLASS WELDING
Paul F. Forman, Ridgefield, Conn., and Roy Stoll, New York, N.Y., assignors to The Perkin-Elmer Corporation, Norwalk, Conn., a corporation of New York
Filed Mar. 1, 1962, Ser. No. 176,704
11 Claims. (Cl. 29—470.1)

This invention relates to a method for forming a hermetic seal which may additionally be a vacuum seal and the product produced thereby. More specifically, the invention comprises a technique for forming, on a non-metallic element, a metal to non-metal seal by the process of ultrasonic welding. The inventive process is illustrated and is particularly useful for forming such a metal to non-metal seal to an optically transparent material, which may be in the form of a lens or the like.

In the specific embodiment hereinafter more fully described, an aluminum strip is ultrasonically welded to an optical element which may be composed of fused silica. This aluminum strip may then be conveniently utilized for forming a further seal to any other element so as to produce hermetic or vacuum sealing of the optical element. Although there have been some prior successful spot welding of small metal wires to non-metallic material, such as semi-conductive crystals, the present invention is believed to be the first successful vacuum tight, extensive seem welding between a metal and a non-metallic substance of the type mentioned.

An object of the invention is, therefore, the production of a hermetic or vacuum seam weld of a metallic material to a non-metallic one.

A further object of the invention is the provision on an optical element of a hermetically or vacuum sealed metallic strip which may be utilized for further sealing to another element.

Other objects and advantages of the invention will be apparent upon reading the following specification in conjunction with the accompanying drawing in which:

FIG. 1 is a vertical section showing how the metallic strip is welded to an optical element;

FIG. 2 is a plan view of the optical element with the metallic strip attached thereto; and FIG. 3 is an end view of a lens with a metallic strip attached to the peripheral edge thereof.

In FIG. 1 the optical element 10 to which the metallic strip 12 is being attached is shown as being supported upon support 14. The optical element 10 may be composed, for example, of fused silica and the metallic strip 12 is preferably an aluminum alloy. In successful welds actually made, the metallic strip was 1145-H18 full hard temper aluminum alloy which is composed of 99.45 percent pure aluminum. In the successful welds, this aluminum strip was $3/1000$ of an inch thick and the thicknesses of the optical elements were .25″ to .60″. Obviously the thickness of the optical element is not critical and the thickness of the aluminum strip given, although preferable, may be varied somewhat. Element 20 in this figure is the rotary tip of a commercially available ultrasonic seam welder, which is mounted for rotation about a horizontal axis in the plane of the paper so as to be capable of rolling in the plane perpendicular to the paper. In the successful welds actually made, the ultrasonic welder utilized was a WT-100ART 100 watt traversing, rotating welder manufactured by Gulton Industries, Inc., which was supplied with 275 milliamperes of welding energy from a G-100A generator also manufactured by Gulton Industries, Inc. In this particular ultrasonic welder, the rotary tip has a vertical height (as shown in FIG. 1) of approximately 1″ and a width (i.e., the horizontal dimension in FIG. 1) of approximately $1/8$″. In this type of welder, the rotary tip is made to vibrate in the horizontal direction in the plane of the paper in FIG. 1 as indicated by arrows 22 and 24 by means of acoustic compression waves generated by a piezoelectric element and coupled to the rotary tip by means of an acoustic horn. When so vibrated, the rotary tip oscillates left and right in FIG. 1 approximately $1/1000$ of an inch at a very high frequency, such as 20,000 cycles per second.

In order to protect the aluminum strip and to prevent the undesired welding of the aluminum strip 12 to the rotary tip 20 of the welder, a thin strip of metal 16 is introduced between the rotary tip and metallic strip 12. This protective strip 16 may, for example, be of titanium (for example, B120 VCA) of approximately $2/1000$ of an inch thickness. In order to avoid the welding of the titanium strip 16 to the underlying aluminum strip 12, the lower surface 18 of the titanium strip is previously sandblasted and lightly oiled. In performing this seam welding, a clamping force or pressure of 16 pounds was maintained between the rotary tip of the welder and the support 14, although again this force is merely exemplary of the preferred conditions utilized in the invention. When the above conditions are utilized the welder has been shown to be capable of forming a seam weld at the rate of $5\frac{1}{2}$″ per minute. A seam weld along the periphery of the lens to the extent of 10″ has actually been accomplished under the above conditions, there being, of course, no particular limit to the length of seam which may be formed in this manner.

By utilizing the above technique, an aluminum to fused silica weld was effected which exhibited no leakage when vacuum tested with a helium mass spectrometer with a detector sensitivity of $0.01 \times 10^{-8}$ standard cc./sec. of helium, throughout the temperature range of 0° F. to 600° F. with a one atmosphere pressure differential. The limits of temperature mentioned are not the actual limits for which this seal is vacuum-tight, but were simply the limits utilized in this test. Although metallurgical examination showed no alloying effects between the aluminum and the fused silica, nevertheless, the bond formed was so strong that the aluminum could not be removed from the silica without either tearing the aluminum or fracturing the surface of the silica.

In addition to the substances mentioned, the above technique may be utilized for attaching aluminum strips to such materials as glass, fused quartz, ceramics, germanium, sapphire, and similar non-metallic and semi-metallic substances. Conventional glasses, fused silica (or the essentially identical fused quartz), sapphire and other similar completely non-metallic materials may be conveniently grouped under the term "glass-like materials." Although metals other than aluminum may be utilized as the strip, experience has shown that aluminum is the preferred material, since it adheres particularly well to various other substances. Where it is desired to attach a different metallic strip to the underlying non-metallic element, an interleaf of aluminum may be utilized so as to form a sandwich layer therebetween. By this technique of utilizing an aluminum interleaf, a strip of the nickel steel of extremely low expansion coefficient, marketed under the trademark "Invar 36," may be attached to a lens or other element composed of the above-mentioned materials.

FIG. 2 shows the lens 10 with a strip of aluminum 12 welded to the outer zone of one face thereof. Once such a metallic strip has been firmly welded to the lens, the metallic strip may be attached by conventional techniques to another metallic material which forms the lens cell or mount so that the entire assembly may be hermetically or vacuum sealed. Since the aluminum strip may be easily attached in hermetic or vacuum tight manner to such lens cell materials, for example, by conventional welding, brazing, or similar techniques, a hermetic or vacuum tight mounting may be easily effected utilizing the inventive device of FIG. 2.

Another way in which the invention may be utilized is shown in FIG. 3. In this figure the metallic strip 32 has been attached to the peripheral edge of a lens 30. Essentially the same technique as illustrated in FIG. 1 may be utilized for so attaching strip 32 except, of course, the position of the lens would be different. With the strip positioned as shown in FIG. 3, lens 30 may be readily sealed to the interior of a cylindrical surface in hermetic or vacuum tight manner. Thus the aluminum strip 32 may be hermetically or vacuum sealed to such a member in any of the conventional manners mentioned so as to form hermetic or vacuum seal between the lens and such member.

As previously stated, as herein used the term "glass-like transparent optical material" includes conventional glasses (e.g., window glass, high quality optical glass and the like, fused silica (or fused quartz), sapphire and other similar usually substantially transparent non-metallic materials that are suitable for use in optical elements (e.g., lenses, mirror, prisms, etc.). Although the invention has been described by disclosing a specific embodiment and specific conditions for forming the weld between the aluminum strip and the non-metallic material, it is obvious that various changes may be made without departing from the spirit of the invention. Therefore, the invention is not limited to any of the specific relations or conditions given but rather is defined by the scope of the appended claims.

We claim:

1. The method of adhering a thin metallic strip to an element of substantial thickness, composed of glass-like material, which comprises the steps of:
   positioning one surface of said thin strip adjacent to one surface of said thick glass-like element;
   placing the tip of an ultrasonic seam welder effectively upon the opposite surface of said thin strip;
   and moving said tip along said opposite surface while said welder is operating and simultaneously applying a predetermined force on said strip by said tip so as to maintain a pressure between said one surface of said thin strip and said one surface of said thick glass-like element;
   thereby forming a strong seam weld between said last-mentioned surfaces.

2. The method of claim 1, in which said thin metallic strip is a few thousandths of an inch in thickness.

3. The method of claim 1, in which the majority constituent of said thin metallic strip is aluminum.

4. The method of claim 3, in which said thin metallic strip is composed of at least about 90% aluminum.

5. The method of claim 1, in which said thick glass-like element is composed of a substantially optically transparent material, thereby being an optical element.

6. The method of claim 5, in which said glass-like material includes a substantial amount of fused silica.

7. The method of claim 1, in which said predetermined force is between 8 and 32 pounds.

8. The method of adhering a thin metallic strip to an element of substantial thickness, composed of glass-like material, which comprises the steps of:
   positioning one surface of said thin metallic strip adjacent to one surface of said thick glass-like element;
   positioning a protective sheet upon the opposite surface of said thin metallic strip;
   placing the tip of an ultrasonic seam welder directly upon the surface of said protective sheet which is remote from said thin metallic strip;
   and moving said tip along said remote surface of said protective sheet while said welder is operating and simultaneously applying a predetermined force on said protective sheet by said tip so as to maintain a pressure between said one surface of said thin metallic strip and said one surface of said thick glass-like element;
   thereby forming a strong seam weld between said last-mentioned surfaces.

9. The method of claim 8, in which the majority constituent of said protective sheet is titanium.

10. The method of claim 8, in which at least one surface of said protective sheet is previously treated so as to prevent its welding to another element during the welding of said thin metallic strip to said thick glass-like element.

11. The method of claim 10, in which said previous treatment comprises sandblasting and oiling of said surface of said protective sheet.

References Cited

UNITED STATES PATENTS

| | | | |
|---|---|---|---|
| 2,223,124 | 11/1940 | Owen | 65—35 |
| 2,702,968 | 3/1955 | Dreshman | 65—35 |
| 2,471,079 | 5/1949 | Post et al. | 154—2.3 |
| 2,521,846 | 9/1950 | Gregory | 154—2.3 |
| 2,413,338 | 12/1946 | Small | 65—36 |
| 2,522,082 | 9/1950 | Arnold | 157—73 |
| 2,770,923 | 11/1956 | Dalton et al. | 65—59 |
| 2,946,120 | 7/1960 | Jones et al. | 29—498 |
| 3,100,337 | 8/1963 | Dunbar et al. | 29—471.1 |
| 2,946,119 | 7/1960 | Jones et al. | 29—497.5 X |

JOHN F. CAMPBELL, *Primary Examiner.*

GEORGE M. BERGERT, *Examiner.*

W. J. VANBALEN, L. J. WESTFALL,
*Assistant Examiners.*